United States Patent [19]

Rule

[11] Patent Number: 4,614,663
[45] Date of Patent: Sep. 30, 1986

[54] FAT COMPOSITIONS
[75] Inventor: Arthur W. T. Rule, Westbourne, Near Emsworth, England
[73] Assignee: John Wyeth & Brother Ltd., Maidenhead, England
[21] Appl. No.: 730,269
[22] Filed: May 3, 1985

Related U.S. Application Data
[63] Continuation of Ser. No. 619,868, Jun. 12, 1984, abandoned.

[30] Foreign Application Priority Data

Jun. 24, 1983 [GB] United Kingdom ............... 8317248

[51] Int. Cl.$^4$ .............................................. A23D 5/00
[52] U.S. Cl. .................................... 426/601; 426/607; 426/613; 426/801
[58] Field of Search ............... 426/601, 607, 585, 801, 426/613

[56] References Cited

U.S. PATENT DOCUMENTS 2,659,676 11/1953 Howard ..................... 426/801 X
3,542,560 11/1970 Tomarelli et al. .
3,649,295 3/1972 Bernhart .
4,216,236 8/1980 Müeller et al. ................ 426/801 X
4,282,265 8/1981 Theuer ................. 426/607

FOREIGN PATENT DOCUMENTS 2067587 7/1981 United Kingdom .

*Primary Examiner*—Robert Yoncoskie
*Attorney, Agent, or Firm*—Arthur G. Seifert

[57] ABSTRACT

The invention relates to novel, edible fat-containing food products adapted for human infant nutrition containing a novel fat composition. The fat composition comprises (a) palm oil; (b) an oil selected from olive oil and oleic oil; (c) an oil selected from coconut oil, babassu oil and palm kernel oil; (d) an oil selected from soybean oil, corn oil, sunflower seed oil, cotton seed oil and safflower oil, and, if desired, (e) up to 2% calculated on the weight of the fat composition, of a lecithin such as soy lecithin. The amounts of the oils are so chosen that the composition contains defined quantities of linoleic acid, oleic acid, lauric and myristic acids and palmitic and stearic acids.

9 Claims, No Drawings

FAT COMPOSITIONS

This application is a continuation of application Ser. No. 619,868, filed June 12, 1984 now abandoned.

The present invention relates to an edible fat composition and food products for infant nutrition containing the fat composition.

Infant formulas contain one or more fats in association with other nutritional compounds such as protein, carbohydrate etc. Considerable research has been carried out over the years to improve the characteristics of infant formulas. Nevertheless there is still a need for improvements in the design of the fat to encourage maximum absorption thereof by the infant.

The extent of absorption is known to depend upon the chemical composition of the fatty acids. Thus studies by Holt et al., J. Pediat. 6, 427 (1935) established that that absorption is favoured by unsaturated fatty acids and fatty acids with relatively short carbon chains and is impaired by the presence of long chain saturated fatty acids. In practice stearic and palmitic acids are the least well absorbed acids. Thus U.S. Pat. No. 3,649,295 teaches at column 3, lines 17 to 21 that is possible to estimate the percentage of fat absorption based upon the sum of the palmitic and stearic acids. A high percent of absorption is said to be expected where the fatty acid composition contains less than 15 percent stearic and palmitic acids. However such a fatty acid composition frequently has the disadvantage that the linoleic acid content is higher than one would desire.

The positional distribution of palmitic acid in the triglycerides also influences the extent of absorption. In particular U.S. Pat. No. 3,542,560 demonstrated that palmitic acid was comparatively well absorbed from the $\beta$-position of the triglycerides but poorly absorbed from the $\alpha$- and $\alpha'$-positions. Thus this reference discourages the use of fats containing a low proportion of $\beta$-palmitic acid such as corn, soybean, palm, peanut, coconut, olive, babassu, cottonseed, oleo, tallow and the like unless a fat having a relatively high proportion of $\beta$-palmitic acid such as lard is also used. However lard is unacceptable to many on religious grounds.

In view of the aforesaid teaching one would not expect fat blends to have a high fat absorption unless the blend has a relatively high proportion of a $\beta$-palmitic acid or the sum of the palmitic and stearic acids constitute less than about 15% of the total fatty acids. However one surprising exception is known from the absorption results reported in the art. The exception relates to the invention of U.S. Pat. No. 3,649,295. An embodiment thereof designated as formula J and consisting of 25% oleic oil, 33% oleo oil, 15% soybean oil and 27% coconut oil showed a fat absorption in 7–10 day infants of 89.8% compared with 85.0% for human milk. This result was unexpected on the basis of the palmitic and stearic acid contents. Moreover the reason for the unexpectedly high fat absorption could not be predicted from the existing knowledge relating to fat absorption.

Fat blends falling within the scope of U.S. Pat. No. 3,649,295 have been used in commercial infant formulas. One such fat blend is designated as blend C below. It has now been found that a novel fat composition is better absorbed than blend C as is shown by results quoted below.

The present invention provides a fat composition comprising (a) palm oil; (b) an oil selected from olive oil and oleic oil; (c) an oil selected from coconut oil, babassu oil and palm kernel oil; (d) an oil selected from soybean oil, corn oil, sunflower seed oil, cottonseed oil and safflower oil, and if desired, (e) up to 2% calculated on the weight of the fat composition, of a lecithin such as soy lecithin; the amounts of the oils being such that the fat composition contains, per 100 parts by weight of fatty acids, (i) 17 to 22, preferably 18 to 20, parts by weight of linoleic acid; (ii) 28 to 44, preferably 30 to 36, parts by weight of oleic acid; (iii) 7 to 25, preferably 15 to 22, parts by weight of the sum of lauric and myristic acids and (iv) 18 to 26, preferably 18 to 24, advantageously 18 to 22, parts by weight of the sum of palmitic and stearic acids.

In practice the total number of parts given under items (i) to (iv) will not total 100 parts because the fatty acid composition will include minor quantities of other fatty acids.

The preferred components of the fat composition of the invention are (a) palm oil, (b) oleic oil (c) coconut oil and (d) soybean oil or corn oil and (e) soy lecithin. The amounts of the oils used are such as to provide the defined fatty acid profile.

The absorption characteristics of fat blends may be determined by the following procedure.

Young male Sprague-Dawley rats (Tekland) are fed a fat-free diet during a three day pretest period. The diet consists of (g/kg); vitamin-test casein, 220; cerelose, 719; mineral mix, 40; cellulose, 10; choline chloride, 1; and vitamin mix, 10. The rats are then divided by weight into groups of equal average weight (228 g), 8 rats per group. Group A continues to receive the fat-free diet for the next six days. Each of the other groups are fed a diet containing a test fat blend for 3 days, and then fed the fat-free diet for the next 3 days. The test fat is added at a concentration of 15%, replacing an equal weight of cerelose in the fat-free composition.

Food consumption and body weight gain are recorded for the six day test period. Feces are collected daily from each individual rat and stored under alcohol until analysed for fat. Food and fecal fats are determined by the procedure of van de Kamer—a titration of the fatty acids of the saponified fat.

Two fat blends designated C and D were tested in the above procedure. Blend D is an example according to the present invention. As explained above, blend C is an embodiment of the invention of U.S. Pat. No. 3,649,295.

TABLE I

| Composition of Blends (% by weight) | C | D |
|---|---|---|
| Palm Oil | 0 | 30 |
| Oleic Oil (oleinate 181) | 15 | 20 |
| Coconut Oil | 27 | 27 |
| Soy Oil | 22 | 22 |
| Soy Lecithin Concentrate | 1 | 1 |
| Oleo Oil | 35 | 0 |

TABLE II

| Fatty Acid Composition of Blends (% by weight) | Fat Blend | |
|---|---|---|
|  | C | D |
| Caprylic | 1.9 | 1.8 |
| Capric | 1.4 | 1.4 |
| Lauric | 12.6 | 12.7 |
| Myristic | 6.2 | 5.7 |
| Palmitic | 14.5 | 17.6 |
| Palmitoleic | 2.1 | 0.6 |
| Stearic | 7.9 | 4.1 |

TABLE II-continued

| Fatty Acid Composition of Blends (% by weight) | | |
|---|---|---|
| | Fat Blend | |
| | C | D |
| Oleic | 33.3 | 33.9 |
| Linoleic | 16.5 | 19.3 |
| Linolenic | 2.4 | 2.4 |

In addition other fatty acids are present in amounts below 0.5%. The composition is based upon GLC analysis.

TABLE III

| | RESULTS | |
|---|---|---|
| Group | Weight Gain (g.) | % Absorption of Fat |
| A (Fat free) | 15.3 | — |
| C | 16.5 | 96.0 |
| D | 16.5 | 97.7 |

Both fat blends are absorbed remarkably well. However it will be observed that fat blend D had a higher percentage fat absorption than fat blend C.

The present invention also provides a food product adapted for human infant nutrition containing the fat composition according to the invention. Basically the food product comprises the fat composition, a protein source and a carbohydrate. The product may be a ready-to-feed liquid or in the form of a powder or concentrated liquid adapted to provide a ready-to-feed form by the addition of water and stirring. The product preferably contains 1 to 6 g, advantageously about 3.6 g of the fat composition of the invention, 1 to 2.5 g, advantageously about 2.1 g of protein and 2 to 15 g, advantageously about 6 to 9 g, of carbohydrate per 100 ml of the ready-to-feed liquid.

As proteins there may be mentioned casein, salts of casein (e.g. potassium caseinate) and lactalbumin. In particular cow's milk protein, whey protein or hydrolysed whey protein may be used. Cow's milk protein differs from that of human milk in the proportions present as casein and lactalbumin. Cow's milk has about 80% casein and 20% whey proteins whereas human milk has about 40% casein and about 60% whey proteins. Accordingly the protein used may be adapted to simulate that of human milk by supplementing cow's milk protein with an appropriate amount of whey protein. Because whey contains a very high proportion of the minerals of milk, the whey is subjected to demineralisation, in particular by electrodialysis to prepare whey protein. Where a milk-free diet for infants who are intolerant of cow's milk protein is desired, the protein source may be isolated soy protein or hydrolysed casein.

As carbohydrate source lactose is generally preferred for most infants but may be undesirable in some cases, in particular in respect of infants suffering from lactose intolerance or cow's milk protein intolerance. Where a milk-free diet is desired, the carbohydrate source may be corn syrup solids or a combination of corn syrup solids with sucrose.

Additionally the infant formula would contain minerals to provide nutritionally acceptable quantities of calcium, phosphorus, potassium, sodium, chloride, magnesium, iron, copper, zinc and iodine and adequate quantities of the vitamins such as vitamin A, vitamin D, vitamin E, vitamin $B_1$, vitamin $B_2$, vitamin $B_3$, vitamin $B_6$, vitamin C, nicotinamide, folic acid, vitamin $K_1$, biotin and chloline.

The invention includes a process for the preparation of the fat composition by blending the components (a), (b), (c) and (d) and, if desired (e) together in such proportions that the resultant composition has the required composition of fatty acids. The proportions to be used can be calculated from the fatty acid profiles of the individual components. The blending is preferably performed at a blending temperature above the melting point of palm oil (circa. 35° C.), whereby each component oil is in the liquid phase. The heating of the oils to the blending temperature and the mixing of the oils in a conventional mixing apparatus should be carried out with careful temperature control. A blending temperature within the range of about 36° C. to 50° C. may be used.

Alternatively the blending may be crried out by dissolving the solid component or components in at least a part of the liquid components which have been heated to a temperature preferably about 50° C. and, where appropriate, adding the remainder of the liquid components.

To prepare the food product the fat composition is combined with the other components. Processing may be carried out in manner known per se. Oil-soluble vitamins are normally dissolved in the fat composition as a preliminary step.

The invention is illustrated by the following Examples:

EXAMPLE 1

Four embodiments of the fat compositions of the invention are as follows:

TABLE IV

| Composition of Blends (% by weight) | | | | |
|---|---|---|---|---|
| | Fat Blend | | | |
| | B | D | F | G |
| Palm Oil | 35 | 30 | 27 | 25 |
| Oleic Oil (oleinate 181) | 15 | 20 | 23 | 25 |
| Coconut Oil | 27 | 27 | 27 | 27 |
| Soya Bean Oil | 22 | 22 | 22 | 22 |
| Soy Lecithin Concentrate | 1 | 1 | 1 | 1 |

TABLE V

| Fatty Acid Composition of Blends (% by weight) | | | | |
|---|---|---|---|---|
| | Fat Blend | | | |
| | B | D | F | G |
| Caprylic | 1.8 | 1.8 | 1.9 | 1.9 |
| Capric | 1.5 | 1.4 | 1.4 | 1.4 |
| Lauric | 13.1 | 12.7 | 14.6 | 14.6 |
| Myristic | 5.9 | 5.7 | 5.1 | 5.1 |
| Palmitic | 19.6 | 17.6 | 16.5 | 15.8 |
| Stearic | 4.1 | 4.1 | 3.2 | 3.2 |
| Oleic | 31.9 | 33.9 | 35.6 | 36.3 |
| Linoleic | 19.0 | 19.3 | 18.9 | 19.0 |
| Linolenic | 2.4 | 2.4 | 1.3 | 1.3 |

Values quoted for blends B and D are based upon GLC analysis. Those quoted for blends F and G represent calculated values based upon literature values for the individual oils.

EXAMPLE 2

Using fat blend D of Example 1, the following ready-to-feed infant formula is prepared, the amounts being set forth in 100 ml.

| | |
|---|---|
| Fat Blend D | 3.6 g |
| Soya Bean Protein Isolates | 2.1 g |
| Corn Syrup Solids | 6.9 g |
| Calcium | 63.0 mg |
| Phosphorus | 44.5 mg |
| Iron | 0.67 mg |
| Zinc | 0.37 mg |
| Copper | 0.05 mg |
| Sodium | 20.0 mg |
| Potassium | 74.0 mg |
| Magnesium | 6.9 mg |
| Chloride | 37.0 mg |
| Iodine | 0.01 mg |
| Manganese | 0.11 mg |
| Vitamin A (retinol) | 265 I.U. |
| Vitamin D (cholecalciferol) | 42.5 I.U. |
| Vitamin E | 0.95 I.U. |
| Vitamin $B_1$ (thiamine) | 0.08 mg |
| Vitamin $B_2$ (riboflavine) | 0.11 mg |
| Vitamin $B_3$ (pantothenic acid) | 0.32 mg |
| Vitamin $B_6$ (pyridoxine) | 0.05 mg |
| Vitamin $B_{12}$ (cyanocobalamin) | 0.21 μg |
| Vitamin C (ascorbic acid) | 5.8 mg |
| Nicotinamide | 1.00 mg |
| Folic Acid | 5.3 μg |
| Vitamin $K_1$ | 10.5 μg |
| Biotin | 3.70 μg |
| Choline | 9.0 mg |
| Water | 100 ml |

This formula is a nutritionally complete one particularly suitable for younger infants who receive the formula as the only source of food.

EXAMPLE 3

Older infants, from about four months of age onwards, may be fed with a formula that is not intended to supply the full nutritional needs of the infant as some nutrients will be provided by solid foods and other drinks. An example of such a formula in ready-to-feed form contains the following nutrients:

| Nutrient | Per 100 ml of Ready-to-Feed formula | Per 100 g of Powder |
|---|---|---|
| Protein g. (from skimmed milk and demineralised whey) | 2.9 | 20 |
| Fat Blend B g. | 2.6 | 18 |
| Carbohydrate g. (Lactose and Corn Syrup Solids) | 8.0 | 55 |
| Calcium mg | 115 | 800 |
| Phosphorus mg | 94 | 650 |
| Iron mg | 0.8 | 5.5 |
| Copper mg | 0.058 | 0.4 |
| Zinc mg | 0.43 | 3.0 |
| Iodine mcg | 6.9 | 55 |
| Sodium mg | 39.7 | 275 |
| Magnesium mg | 9.4 | 65 |
| Potassium mg | 105.4 | 730 |
| Chloride mg | 75.4 | 522 |
| Manganese mcg | 17 | 120 |
| Vitamin A iu | 299 | 2070 |
| Vitamin E iu | 1.08 | 7.42 |
| Vitamin $K_1$ mcg | 6.6 | 45.6 |
| Thiamine mg | 0.081 | 0.56 |
| Riboflavine mg | 0.12 | 0.82 |
| Vitamin $B_6$ mg | 0.048 | 0.33 |
| Vitamin $B_{12}$ mcg | 0.12 | 0.82 |
| Vitamin C mg | 6.6 | 45.6 |
| Niacin mg | 0.61 | 4.2 |
| Pantothenic acid mg | 0.24 | 1.65 |
| Folic acid mcg | 6.0 | 41.4 |
| Choline mg | 4.73 | 32.8 |
| Biotin mcg | 1.71 | 11.8 |
| Vitamin D iu | 48 | 322 |

EXAMPLE 4

Further embodiments of fat blends of the invention are as follows:

TABLE VI

Composition of Blends (% by weight)

| | Fat Blend | | | | | | |
|---|---|---|---|---|---|---|---|
| | i | ii | iii | iv | v | vi | vii |
| Palm Oil | 35 | 35 | 35 | 35 | 28 | 35 | 35 |
| Coconut Oil | 27 | — | — | 27 | — | — | 27 |
| Babassu Oil | — | 27 | 27 | — | — | 28 | — |
| Palm Kernel Oil | — | — | — | — | 30 | — | — |
| Oleic Oil (Oleinate 181) | — | 15 | 15 | 15 | — | — | — |
| Olive Oil | 15 | — | — | — | 19 | 14 | 13 |
| Soya Bean Oil | — | — | — | 22 | — | — | — |
| Corn Oil | — | — | — | — | — | 22 | — |
| Safflower Oil | — | — | — | — | — | — | 2 |
| Sunflower Oil | 22 | — | 22 | — | — | — | 22 |
| Cottonseed Oil | — | 22 | — | — | 22 | — | — |
| Soy Lecithin Concentrate | 1 | 1 | 1 | 1 | 1 | 1 | 1 |

TABLE VII

Fatty Acid Composition of Blends (% by weight)

| | Fat Blend | | | | | | |
|---|---|---|---|---|---|---|---|
| | i | ii | iii | iv | v | vi | vii |
| Caprylic Acid | 1.9 | 1.4 | 1.4 | 1.9 | 0.4 | 1.4 | 1.9 |
| Capric Acid | 1.4 | 1.6 | 1.6 | 1.4 | 0.9 | 1.7 | 1.4 |
| Lauric Acid | 14.5 | 12.2 | 12.2 | 14.6 | 15.2 | 12.6 | 14.5 |
| Myristic Acid | 5.2 | 5.3 | 5.2 | 5.2 | 6.5 | 5.4 | 5.2 |
| Palmitic Acid | 21.7 | 22.3 | 20.1 | 19.5 | 22.0 | 21.3 | 21.6 |
| Stearic Acid | 4.2 | 3.7 | 4.6 | 3.5 | 3.0 | 3.7 | 4.2 |
| Oleic Acid | 31.5 | 34.9 | 36.0 | 32.9 | 33.0 | 32.7 | 30.6 |
| Linoleic Acid | 18.1 | 18.0 | 18.1 | 18.9 | 18.2 | 19.4 | 19.3 |
| Linolenic Acid | 0.6 | 0.1 | 0.5 | 1.4 | 0.2 | 0.4 | 0.6 |

The fatty acid composition presented in Table VII are calculated values based upon literature values for the individual components.

The fat blends mentioned in Examples 1 and 4 are prepared by preheating the individual components to a temperature of about 40° C. and thoroughly mixing the individual components at that temperature.

I claim:

1. A food product adapted for human infant nutrition containing a protein source, a carbohydrate, and a fat composition comprising:
   (a) palm oil;
   (b) olive oil or oleic oil;
   (c) an oil selected from the group consisting of coconut oil, babassu oil and plam kernel oil;
   (d) 22 to 24% calculated on the weight of the fat composition, of one or two oils selected from the group consisting of soybean oil, corn oil, sunflower seed oil, cottonseed oil and safflower oil of which cottonseed oil is present in the amount of 22% of the weight of the fat composition, and
   (e) 0 to 2%, calculated on the weight of the fat composition, of a lecithin; the amounts of the oils being such that the fat composition contains, per 100 parts by weight of fatty acids,
   (i) 18 to 20 parts by weight of linoleic acid;
   (ii) 28 to 44 parts by weight of oleic acid;

(iii) 7 to 25 parts by weight of the sum of lauric and myristic acids; and (iv) 18 to 26 parts by weight of the sum of palmitic and stearic acids.

2. A food product as claimed in claim 1, which contains, per 100 parts by weight of fatty acids, 30 to 36 parts by weight of oleic acid.

3. A food product as claimed in claim 1, which contains, per 100 parts by weight of fatty acids, 15 to 22 parts by weight of the sum of lauric and myristic acids.

4. A food product as claimed in claim 1, which contains, per 100 parts by weight of fatty acids, 18 to 24 parts by weight of the sum of palmitic and stearic acids.

5. A food product as claimed in claim 4, which contains, per 100 parts by weight of fatty acids, 18 to 22 parts by weight of the sum of palmitic and stearic acids.

6. A food product as claimed in claim 1, wherein component (b) is oleic oil.

7. A food product as claimed in claim 1, wherein component (c) is coconut oil.

8. A food product as claimed in claim 1, wherein the second oil of component (d) is soybean oil or corn oil.

9. A food product as claimed in claim 1, containing soy lecithin.

* * * * *